(12) United States Patent
Chen et al.

(10) Patent No.: US 9,319,165 B2
(45) Date of Patent: Apr. 19, 2016

(54) RADIO COEXISTENCE IN WIRELESS NETWORKS

(75) Inventors: Sherry Chen, Portland, OR (US); Marta M. Tarradell, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 162 days.

(21) Appl. No.: 13/997,255

(22) PCT Filed: Sep. 30, 2011

(86) PCT No.: PCT/US2011/054458
§ 371 (c)(1),
(2), (4) Date: Sep. 11, 2013

(87) PCT Pub. No.: WO2013/048512
PCT Pub. Date: Apr. 4, 2013

(65) Prior Publication Data
US 2013/0343236 A1  Dec. 26, 2013

(51) Int. Cl.
*H04J 3/16* (2006.01)
*H04W 88/06* (2009.01)
*H04W 72/12* (2009.01)
*H04J 11/00* (2006.01)
*H04B 1/715* (2011.01)

(52) U.S. Cl.
CPC .............. *H04J 3/1694* (2013.01); *H04B 1/715* (2013.01); *H04J 11/0023* (2013.01); *H04W 72/1215* (2013.01); *H04W 88/06* (2013.01)

(58) Field of Classification Search
None
See application file for complete search history.

(56) References Cited

U.S. PATENT DOCUMENTS

| 7,725,118 | B2 | 5/2010 | Yang et al. |
| 7,929,912 | B2 | 4/2011 | Sherman |
| 2008/0247367 | A1* | 10/2008 | Guo et al. ............ 370/338 |
| 2008/0247445 | A1 | 10/2008 | Guo et al. |
| 2009/0054009 | A1 | 2/2009 | Yang et al. |

(Continued)

FOREIGN PATENT DOCUMENTS

WO  2013/048512 A1  4/2013

OTHER PUBLICATIONS

International Search Report and Written Opinion received for PCT application No. PCT/US2011/054458, mailed on Apr. 18, 2012, 10 pages.

*Primary Examiner* — Kodzovi Acolatse
(74) *Attorney, Agent, or Firm* — Thorpe North & Western LLP

(57) ABSTRACT

Technology for reducing interference in collocated radios is disclosed. One method comprises identifying a repeating transmit/receive (Tx/Rx) pattern for multiple radios located in a mobile communication device having a Bluetooth radio collocated with an OFDMA radio. A persistent reservation is requested for at least one sub-frame from the OFDMA radio when the repeating Tx/Rx pattern indicates a Bluetooth packet wherein the Bluetooth radio can not transmit without interference with the OFDMA radio. The repeating Tx/Rx pattern is modified based on the persistent reservation. The Bluetooth radio can communicate based on the modified repeating Tx/Rx pattern to enable interference free communication for the Bluetooth radio and the OFDMA radio in the multi-radio mobile communication device. A collocated WiFi radio's transceiver can align its Tx/Rx with the Tx/Rx pattern, and transmit and receive at the same time slots that other collocated radios are transmitting, and receiving.

26 Claims, 13 Drawing Sheets

(56) References Cited

U.S. PATENT DOCUMENTS

| | | | |
|---|---|---|---|
| 2010/0135256 A1* | 6/2010 | Lee et al. | 370/336 |
| 2010/0265856 A1* | 10/2010 | Yang | 370/281 |
| 2010/0322287 A1 | 12/2010 | Truong et al. | |
| 2012/0188907 A1* | 7/2012 | Dayal et al. | 370/254 |

* cited by examiner

| BT interval [$T_{esco}$] | Number of $T_{esco}$ for periodicity [n] | Duration (ms) based on BT periodicity [$T_{esco}*n*t_{BTslot}$] | Number of LTE frames for periodicity [m] | Duration (ms) based on LTE periodicity [$m*t_{LTEframe}$] |
|---|---|---|---|---|
| 6 | 8 | 30 | 3 | 30 |
| 8 | 2 | 10 | 1 | 10 |
| 10 | 8 | 50 | 5 | 50 |
| 12 | 4 | 30 | 3 | 30 |
| 14 | 8 | 70 | 7 | 70 |
| 16 | 1 | 10 | 1 | 10 |
| 18 | 8 | 90 | 9 | 90 |

FIG. 3a

| BT interval [$T_{esco}$] | Number of $T_{esco}$ for periodicity [n] | All # $T_{esco}$ peridicity is multiple of T with T=8 [n * x = T] |
|---|---|---|
| 6 | 8 | 8 * 1 = 8 |
| 8 | 2 | 2 * 4 = 8 |
| 10 | 8 | 8 * 1 = 8 |
| 12 | 4 | 4 * 2 = 8 |
| 14 | 8 | 8 * 1 = 8 |
| 16 | 1 | 1 * 8 = 8 |
| 18 | 8 | 8 * 1 = 8 |

FIG. 3b

| LTE UL-DL configuration | Tosco = 6 | Tosco = 8 | Tosco = 10 | Tosco = 12 | Tosco = 14 | Tosco = 16 | Tosco = 18 |
|---|---|---|---|---|---|---|---|
| 0 | 024x024x | 0xxxxxxx | 0x420x42 | 04040404 | 024x024x | 0xxxxxxx | 0x420x42 |
| 1 | 024x024x | 0xxxxxxx | 0x420x42 | 04040404 | 024x024x | 0xxxxxxx | 0x420x42 |
| 2 | 024x024x | 0xxxxxxx | 0x420x42 | 04040404 | 024x024x | 0xxxxxxx | 0x420x42 |
| 3 | 0x4xx2xx | 0x0x0x0x | 0xx2xx4x | 04xx04xx | 024xxxxx | 0xxxxxxx | 0xxxxx42 |
| 4 | 0x4xx2xx | 0x0x0x0x | 0xx2xx4x | 04xx04xx | 024xxxxx | 0xxxxxxx | 0xxxxx42 |
| 5 | 0x4xx2xx | 0x0x0x0x | 0xx2xx4x | 04xx04xx | 024xxxxx | 0xxxxxxx | 0xxxxx42 |
| 6 | 0x4xx2xx | 0x0x0x0x | 0xx2xx4x | 04xx04xx | 024xxxxx | 0xxxxxxx | 0xxxxx42 |

FIG. 4a

| LTE UL-DL configuration | Tosco = 6 | Tosco = 8 | Tosco = 10 | Tosco = 12 | Tosco = 14 | Tosco = 16 | Tosco = 18 |
|---|---|---|---|---|---|---|---|
| 0 | 02400240 | 00000000 | 00420042 | 04040404 | 02400240 | 00000000 | 00420042 |
| 1 | 02400240 | 00000000 | 00420042 | 04040404 | 02400240 | 00000000 | 00420042 |
| 2 | 02000200 | 00000000 | 00020002 | 00000000 | 02000200 | 00000000 | 00020002 |
| 3 | 00400200 | 00000000 | 00020040 | 04000400 | 02400000 | 00000000 | 00000042 |
| 4 | 00400200 | 00000000 | 00020040 | 04000400 | 02400000 | 00000000 | 00000042 |
| 5 | 00000200 | 00000000 | 00020000 | 00000000 | 02000000 | 00000000 | 00000002 |
| 6 | 040022x0 | 02020202 | 0xx22044 | 042x042x | 024024x0 | 00000000 | 0xxxxx42 |

FIG. 4b

| LTE UL-DL configuration | $T_{esco} = 6$ | $T_{esco} = 8$ | $T_{esco} = 10$ | $T_{esco} = 12$ | $T_{esco} = 14$ | $T_{esco} = 16$ | $T_{esco} = 18$ |
|---|---|---|---|---|---|---|---|
| 0 | 00010001 | 00000000 | 01000100 | 00000000 | 00010001 | 00000000 | 01000100 |
| 1 | 00010001 | 00000000 | 01000100 | 00000000 | 00010001 | 00000000 | 01000100 |
| 2 | 00010001 | 00000000 | 01000100 | 00000000 | 00010001 | 00000000 | 01000100 |
| 3 | 01011011 | 01010101 | 01101101 | 00110011 | 00011111 | 00000000 | 01111100 |
| 4 | 01011011 | 01010101 | 01101101 | 00110011 | 00011111 | 00000000 | 01111100 |
| 5 | 01011011 | 01010101 | 01101101 | 00110011 | 00011111 | 00000000 | 01111100 |
| 6 | 01011011 | 01010101 | 01101101 | 00110011 | 00011111 | 00000000 | 01111100 |

FIG. 5a

| LTE UL-DL configuration | $T_{esco} = 6$ | $T_{esco} = 8$ | $T_{esco} = 10$ | $T_{esco} = 12$ | $T_{esco} = 14$ | $T_{esco} = 16$ | $T_{esco} = 18$ |
|---|---|---|---|---|---|---|---|
| 0 | 00000000 | 00000000 | 00000000 | 00000000 | 00000000 | 00000000 | 00000000 |
| 1 | 00000000 | 00000000 | 00000000 | 00000000 | 00000000 | 00000000 | 00000000 |
| 2 | 00000000 | 00000000 | 00000000 | 00000000 | 00000000 | 00000000 | 00000000 |
| 3 | 00000000 | 00000000 | 00000000 | 00000000 | 00000000 | 00000000 | 00000000 |
| 4 | 00000000 | 00000000 | 00000000 | 00000000 | 00000000 | 00000000 | 00000000 |
| 5 | 00000000 | 00000000 | 00000000 | 00000000 | 00000000 | 00000000 | 00000000 |
| 6 | 00000010 | 00000000 | 00100000 | 00010001 | 00000010 | 00000000 | 01111100 |

FIG. 5b

RADIO COEXISTENCE IN WIRELESS NETWORKS

BACKGROUND

Modern wireless devices such as cell phones, tablets, and other portable computing devices often include multiple types of radios for communication purposes. For instance, a smart phone may include a 4G radio to connect to a cell tower, a WiFi radio to connect to a local internet hot spot, and a Bluetooth radio to connect to a nearby device such as a headset or keyboard. The 4G radio can operate in the 2.3 Gigahertz (GHz) and 2.5 GHz range at substantially higher power than the WiFi and Bluetooth radios, which typically operate in the 2.4 GHz range. This can result in communication with the 4G radio causing substantial interference in the lower power WiFi and Bluetooth radios, thereby reducing the effectiveness of communication of each of the collocated radios.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3a provides a table showing a periodicity of the $T_{eSCO}$ intervals for Bluetooth relative to 3GPP LTE TDD frames in accordance with an example;

FIG. 3b provides a table showing that the periodicity of each $T_{eSCO}$ interval is a multiple of eight in accordance with an example;

FIG. 4a is a table showing a transmit/receive (Tx/Rx) pattern for the Bluetooth radio of FIG. 2 for the 3GPP LTE TDD configurations when three different interference avoidance mechanisms are applied in accordance with an example;

FIG. 4b is a table showing a (Tx/Rx) pattern for the Bluetooth radio of FIG. 2 for the 3GPP LTE TDD configurations when two different interference avoidance mechanisms are applied in accordance with an example;

FIG. 5a is a table showing a persistent reservation bitmap for the 3GPP LTE radio based on the Tx/Rx patterns in the table in FIG. 4a in accordance with an example;

FIG. 5b is a table showing a persistent reservation bitmap for the 3GPP LTE radio based on the Tx/Rx patterns in the table in FIG. 4b in accordance with an example;

Figure 1:
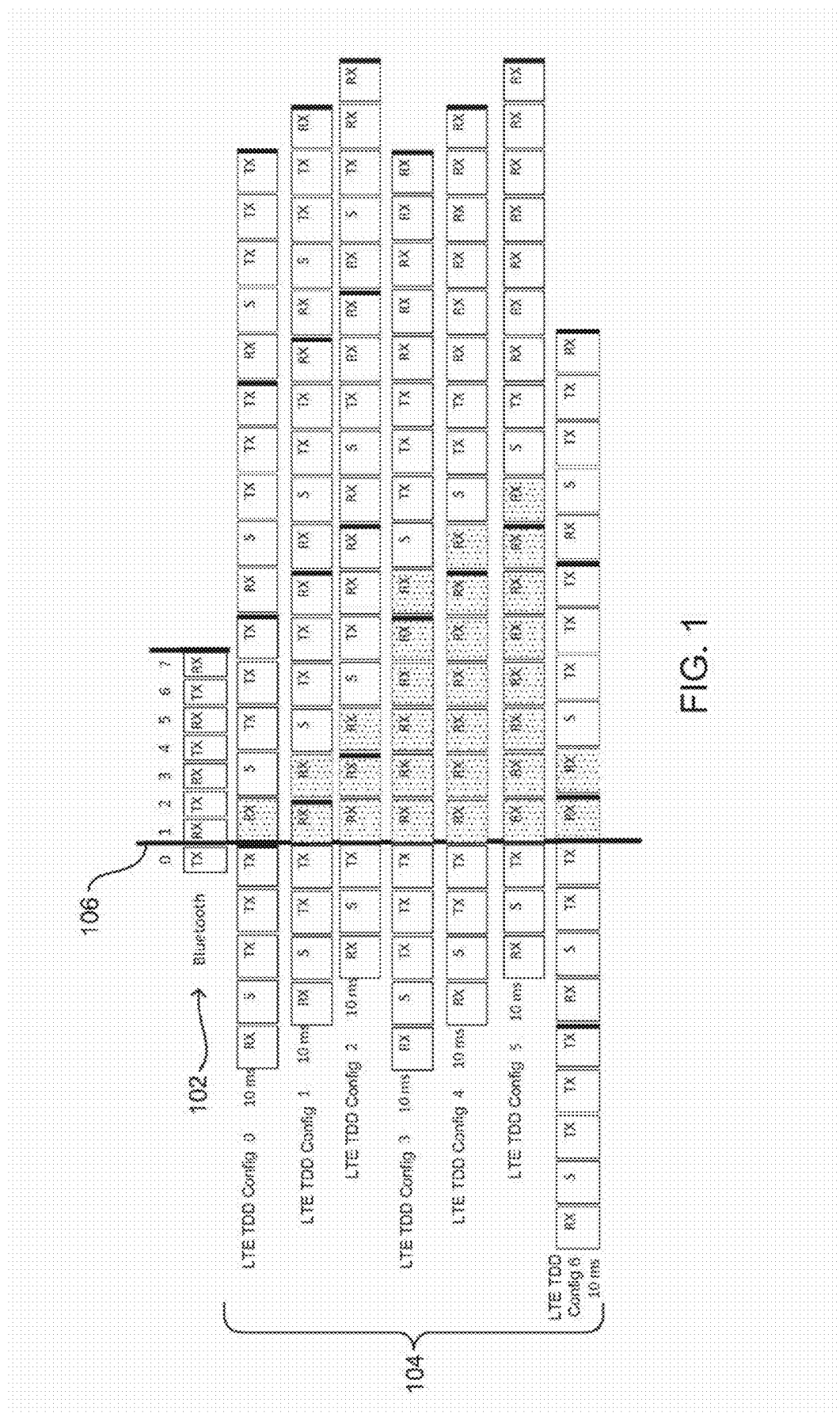
FIG. 1 illustrates a timing diagram of a Bluetooth radio packets synchronized with subframes in several time division duplex (TDD) configurations of a Third Generation Partnership Project (3GPP) Long Term Evolution (LTE) radio in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Bluetooth radios are often collocated with other types of radios. For example, radios which communicate using Orthogonal Frequency Division Multiple Access (OFDMA), such as a Third Generation Partnership Project (3GPP) Long Term Evolution (LTE) radio, an Institute of Electrical and Electronics Engineers (IEEE) 802.16 radio, commonly referred to as WiMAX (Worldwide interoperability for Microwave Access), and/or and IEEE 802.11 radio, commonly referred to as WiFi. A radio configured to communicate using OFDMA is referred to herein as an OFDMA radio.

Each collocated radio may be used for a specific purpose. For instance, a Bluetooth radio can be used to connect with a wireless personal area network (WPAN), a WiFi radio can be used to connect with a wireless local area network (WLAN), and a 3GPP LTE or WiMAX radio can be used to connect with a wireless wide area network (WWAN).

The simultaneous operation in a wireless device of a Bluetooth radio that is collocated with other types of radios which communicate using OFDMA, such as a 3GPP LTE radio, a WiMAX radio, and/or a WiFi radio, can create interference that reduces the data throughput of both radios. Multiple examples are given throughout this specification of a collocated Bluetooth radio and a 3GPP LTE radio. This is not intended to be limiting. The same system(s) and method(s) can apply with other types of OFDMA radios operating in a Time Domain Duplex (TDD) format that are collocated with a Bluetooth radio.

Bluetooth radio reception can collide with transmissions from the 3GPP LTE radio, especially when both radios are collocated on the same device, such as a smart phone, a tablet, a net book, a laptop, or another type of wireless mobile device. Bluetooth transmissions can also desensitize radio reception in the 3GPP LTE radio.

Repeating time-domain transmission/reception (Tx/Rx) patterns can be defined for a 3GPP LTE radio and a collocated Bluetooth radio to coordinate their transmitters and receivers. The Tx/Rx pattern can be repeated at a known interval if data gets allocated with a periodicity on time. The known interval enables persistent reservations to be made in the 3GPP LTE radio to reduce or avoid interferences between the different radios.

For example, the repeated Tx/Rx pattern defines a specific Bluetooth transmit time slot for each Extended Synchronous Connection Oriented (eSCO) packet transmitted by the Bluetooth radio to prevent the Bluetooth transmission from interfering with the 3GPP LTE reception, and to protect 3GPP LTE transmission from interfering with Bluetooth radio reception.

The ability to coordinate the 3GPP LTE and Bluetooth radio transmitters and receivers using persistent reservation also enables additional types of radios to be collocated. For example, a WiFi radio can be coordinated to communicate at specific time periods in the coordination formed between the 3GPP LTE and Bluetooth radios.

FIG. 1 provides a timing diagram showing the transmission and reception of eSCO formatted packets 102 for a Bluetooth radio and the Tx/Rx sub-frames 104 for all seven configurations of a 3GPP LTE radio operating in a Time Division Duplex (TDD) mode. The figures and tables presented herein are displayed using one-slot Bluetooth eSCO packets as an example. However, this interference avoidance technique can be applied to other Bluetooth profiles and packet length (for example three or five slot packets). The Bluetooth eSCO packets can include a variety of different formats having a different number of transmit and receive time slots. For single slot eSCO packets, Bluetooth specifies intervals of 6, 8, 10, 12, 14, 16 and 18. The interval illustrated in FIG. 1 is $T_{eSCO}=8$, comprising four transmit time slots and four receive time slots. Bluetooth also specifies a re-transmit window $W_{eSCO}$ to be 0, 2, or 4. The re-transmit window specifies the number of attempts at transmitting that can occur for a Bluetooth packet within its interval ($T_{eSCO}$). While the specification currently limits the retransmission attempts to 0, 2 or 4 instances, it is possible to include additional retransmission attempts when $T_{eSCO}$ is equal to or greater than 8. Future Bluetooth standards may include additional retransmission attempts, and the embodiments disclosed herein are not limited to the 0, 2 or 4 instances recited in the present standard.

The 3GPP LTE standard, as used herein, can include Releases 8, 9 and 10. However, the embodiments disclosed herein are not limited to these releases. Future standards can also apply when the same TDD configurations and sub-frame timing is used. A radio operating in accordance with at least one of these 3GPP LTE Releases is also referred to herein as a LTE radio. The use of the term 3GPP, 3GPP LTE, or LTE is not intended to be limiting. Any of the terms may refer to any of the releases, including the LTE advanced (LTE-A) release (Release 10).

Currently, seven different LTE TDD configurations are defined for 3GPP LTE communication. FIG. 1 provides an example of each LTE configuration, numbered 0-6. Each configuration is aligned at the beginning 106 of the longer continuous number of receive subframes for each configuration. The Bluetooth packet is synchronized such that a first receive time slot (Slot 1) is aligned with the first receive subframe of the continuous receive subframes in each of the seven LTE configurations.

As illustrated in FIG. 1, the Bluetooth time slots 102 have a different time period from the LTE subframe. The Bluetooth time slots each have a period of 0.625 milliseconds (ms), while each LTE frame has a frame duration of 10 ms. Each LTE frame consists of 10 subframes. Thus, each subframe has a duration of 1 ms. Accordingly, even though the Bluetooth packet is synchronized such that transmit Slot 0 is aligned with a transmit subframe in each LTE TDD configuration, and receive Slot 1 is aligned with the first receive subframe in the continuous receive subframe for each configuration, the transmit and receive slots quickly become unaligned such that transmissions and receptions from the Bluetooth and 3GPP radios will create co-interference in each of the radios. Co-interference occurs when one of the radios transmits during the other radio's receive interval. This is especially true when the 3GPP LTE radio transmits during the receive period of the Bluetooth radio, since the 3GPP LTE radio transmits at significantly higher power and can therefore overpower (or collide) most Bluetooth signals that the Bluetooth radio is attempting to receive during the receive period.

Figure 2:
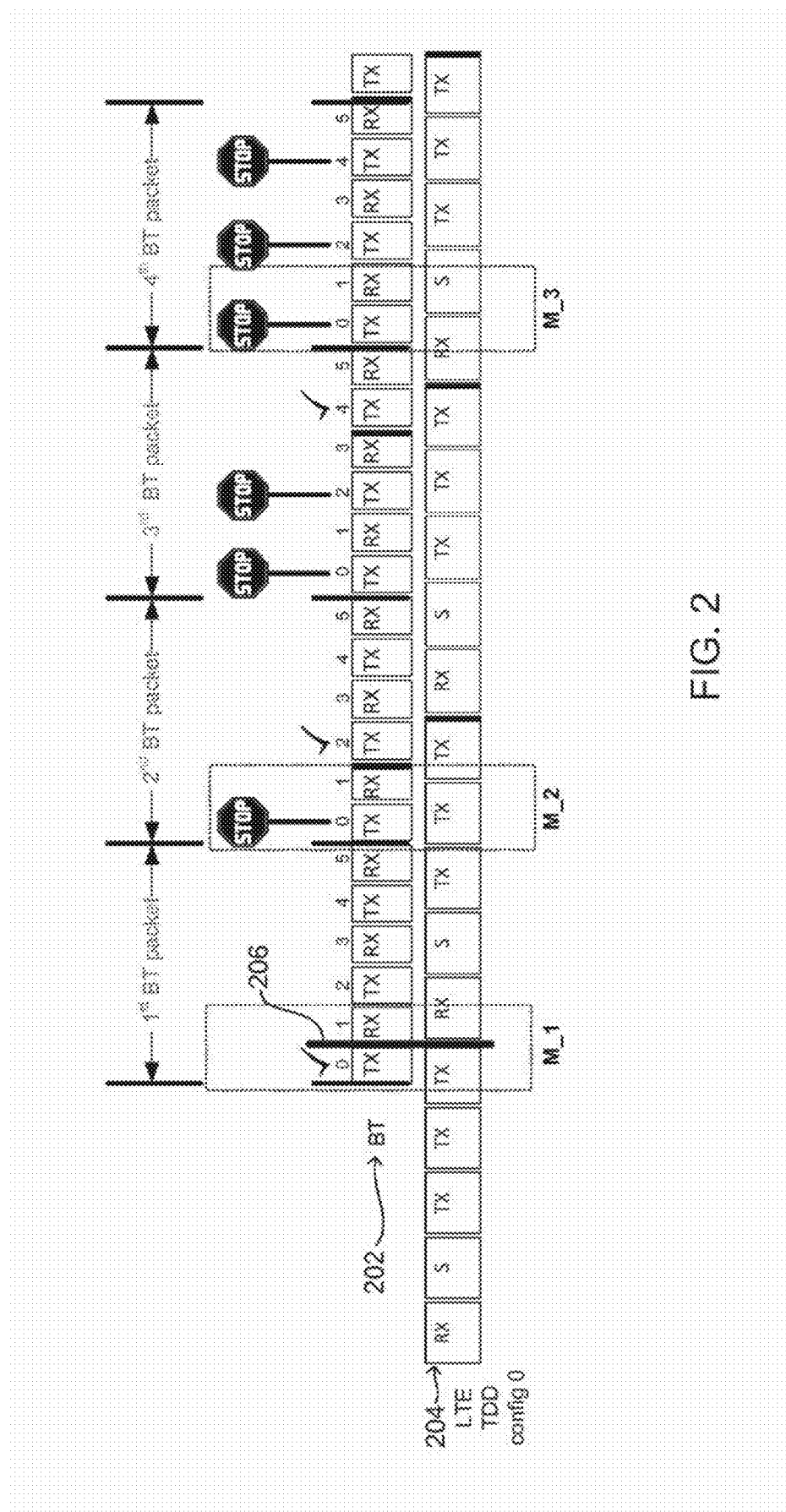
FIG. 2 illustrates a timing diagram of packets from the Bluetooth radio aligned with subframes from the 3GPP LTE (TDD) configuration 0 to illustrate Bluetooth packets transmission and reception success and collisions from interference with a the 3GPP LTE radio in accordance with an example.

FIG. 2 provides a timing diagram that shows Bluetooth time slots 202 for $T_{eSCO}=6$ relative to subframes 204 in 3GPP LTE TDD configuration 0. In this example for each Bluetooth packet or interval, there are three opportunities to transmit the packet. As discussed herein, interference is considered to be avoided when the collocated radios transmit at the same time and receive at the same time.

There are three different mechanisms that can be used to avoid interference between the LTE and Bluetooth radios:
1) M_1: LTE and Bluetooth frame synchronization;
2) M_2: Protect Bluetooth Rx from LTE Tx (delay or cease Bluetooth Tx); and
3) M_3: Protect LTE Rx from Bluetooth Tx (Bluetooth delays or ceases transmission during an LTE Rx subframe.

The first mechanism, M_1, involves frame synchronization of the Bluetooth time slots 202 with the LTE subframes 204. As shown in FIG. 2, the first receive time slot (Slot 1) in the first Bluetooth packet is synchronized to be aligned 206 with the first receive subframe in the continuous receive section of the LTE TDD configuration 0. Successful transmission is denoted by a check mark above a Tx time slot. Using interference avoidance mechanism M_1, interference between the LTE and Bluetooth radios is avoided in the first Bluetooth packet, as illustrated in FIG. 2.

In the second Bluetooth packet illustrated in FIG. 2, the first transmit slot (Slot 0) aligns with an LTE transmit subframe. However, the first receive slot (Slot 1) overlaps an LTE transmit slot, thereby creating a potential for interference at the Bluetooth radio when the LTE radio transmits. A "stop" sign is used to illustrate that this Tx/Rx opportunity cannot be used without causing interference. Using M_2, the Bluetooth Tx can be delayed to the next Tx slot (Slot 2). In this instance Tx Slot 2 and Rx Slot 3 align with an LTE Tx subframe and an LTE Rx subframe, respectively.

Similarly, in the third Bluetooth packet, the first and second Bluetooth Tx and Rx slots do not align with an LTE Tx and Rx subframe. It isn't until Bluetooth Tx Slot 4 and Rx Slot 5 that alignment with an LTE Tx and Rx subframe is achieved.

In the fourth Bluetooth packet, there are no instances when a consecutive Bluetooth Tx and Rx slot aligns with an LTE Tx and Rx subframe. When both M_2 and M_3 are applied to the fourth Bluetooth packet, this will result in no data being transmitted from the Bluetooth radio in the $4^{th}$ Bluetooth packet.

If the illustration of FIG. 2 were continued to show Bluetooth packets 5 through 8, it would be shown that the same pattern would occur in which the transmit time slot for the packets would be time slots 0, 2, 4, and no transmission, which can be represented as the variable "x". Thus, a repeating transmit pattern of (0,2,4,x) occurs between LTE TDD configuration 0 and Bluetooth $T_{eSCO}$=6, with a repetition occurring every four Bluetooth packets. This pattern is referred to as a Tx/Rx pattern since it represents the time slot in each Bluetooth packet at which the Bluetooth radio can transmit and receive.

More broadly, it can be shown that a repetitive Tx/Rx pattern occurs between each of the seven LTE TDD configurations and the seven Bluetooth $T_{eSCO}$ durations. The repetitive Tx/Rx pattern may repeat every 1, 2, 4, or 8 packets, depending on which LTE TDD configuration and Bluetooth packet duration is used.

A table in FIG. 3a represents the periodicity (i.e. the length of the repeating Tx/Rx pattern) for each of the seven different Bluetooth intervals. The left column (BT interval) shows the seven Bluetooth intervals $T_{eSCO}$. For each interval, the number of Bluetooth packets (n) at which the pattern repeats is provided in the second column. The duration of the number of packets in the pattern for each Bluetooth interval is provided in the third column. For instance, for a Bluetooth interval of $T_{eSCO}$=6 time slots, and a repeating pattern of 8 packets, at 0.625 ms per time slot, the duration of the repeating pattern is 8*6*0.625 ms=30 ms. This is equivalent to the duration of three 10 ms LTE frames, providing an LTE frame periodicity of m=3. Each of the durations of the patterns is equivalent to a whole number of LTE frames.

As shown in the second column of FIG. 3b, the pattern for the Bluetooth intervals repeats every 1, 2, 4 or 8 packets (n). The third column shows that each of these patterns is divisible by the number 8. Thus, if at least eight packets are taken into account each time, it assures that the pattern will repeat.

FIG. 4a provides a table showing the repeating Tx/Rx pattern for each LTE TDD configuration and for each Bluetooth packet interval for $W_{eSCO}$=4. As previously discussed, each number represents the transmit slot in a Bluetooth eSCO packet at which the Bluetooth radio is able to transmit and receive without interference with the 3GPP LTE radio when the radios are synchronized, as previously discussed. The value "x" is used to show a packet where no Bluetooth transmission and reception is possible without interference with the 3GPP LTE radio when all three mechanisms M_1, M_2, and M_3 are applied. If there is enough isolation between Bluetooth and 3GPP LTE radios, only the first two mechanisms may need to be applied to avoid interference. Accordingly, FIG. 4b provides a similar table where only mechanisms M_1 and M_2 are applied. Both FIGS. 4a and 4b show that the pattern repeats every 1, 2, 4 or 8 Bluetooth packets.

Using the tables to determine when to allow a Bluetooth radio to transmit can significantly reduce the need for retransmissions. This can appreciably reduce the amount of energy used in transmitting the same amount of data and reduce interference with other collocated wireless technologies such as WiFi or other technologies.

Because the pattern repeats every 8 Bluetooth packets, the 3GPP LTE radio can be instructed to yield to the Bluetooth radio for selected packets that are lost; or to protect LTE reception that is desensitized from Bluetooth transmission. When the 3GPP LTE radio yields, a portion of an LTE subframe may cease transmission or reception to allow a selected Bluetooth transmit slot and receive slot without generating collision, as shown in FIG. 2.

Figure 6:
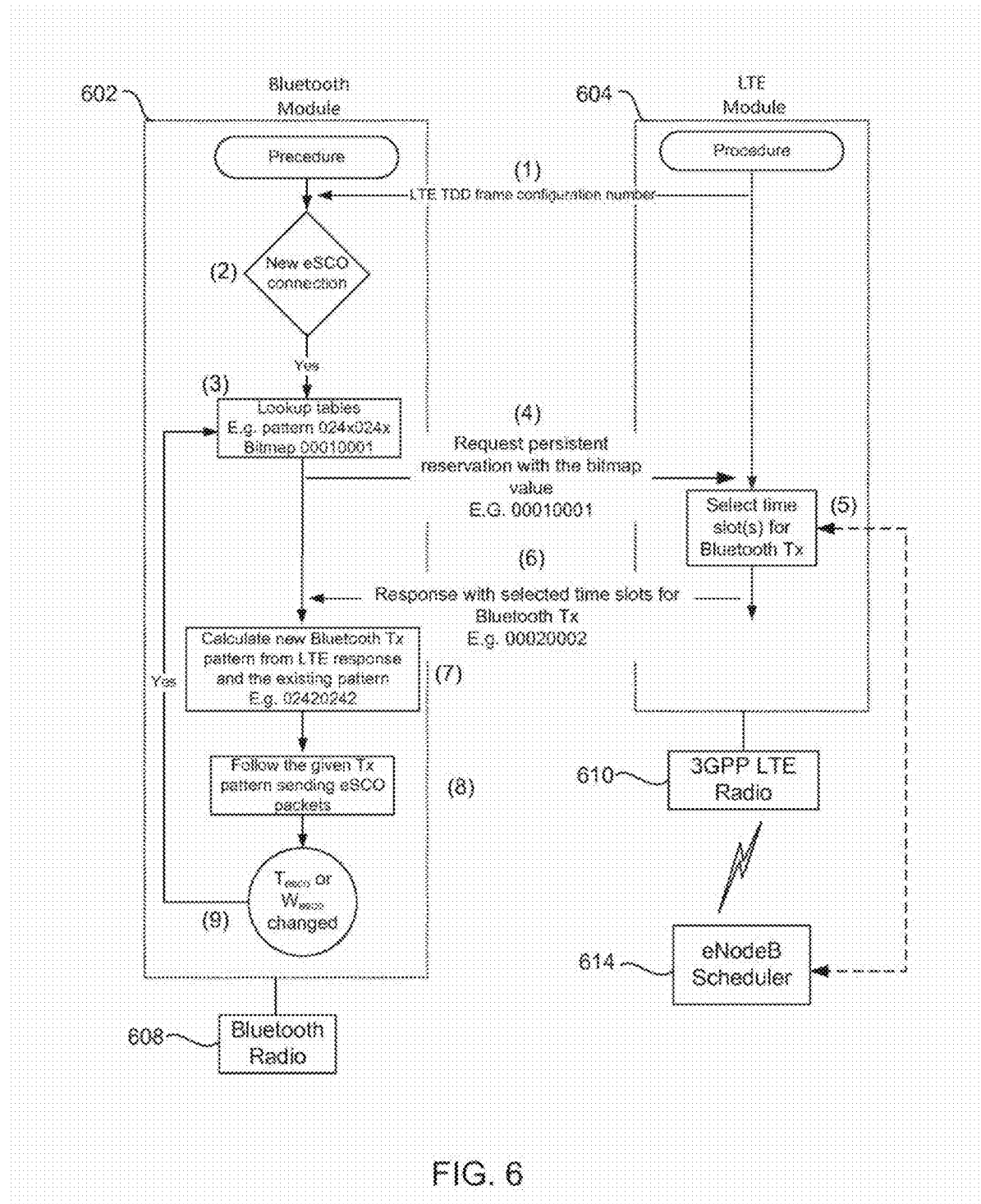
FIG. 6 is a flow chart providing an implementation wherein a Bluetooth is in charge of bitmap table lookup and provides persistent reservation instructions to the 3GPP LTE radio, in accordance with an example.
Figure 7:
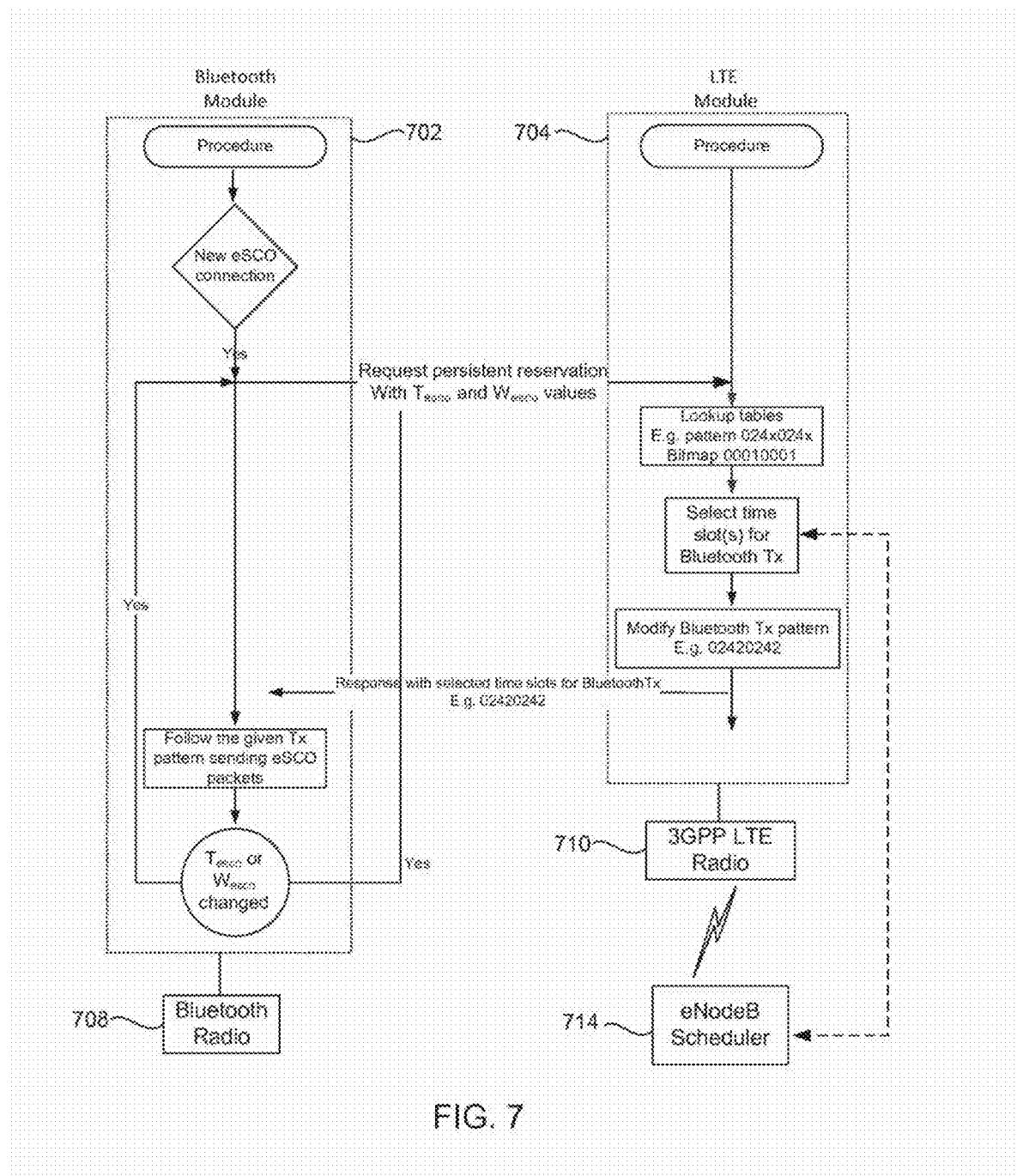
FIG. 7 is a flow chart providing an implementation wherein a 3GPP LTE radio is in charge of bitmap table lookup and derives persistent reservation instructions from the Bluetooth radio, which in accordance with an example.
Figure 8:
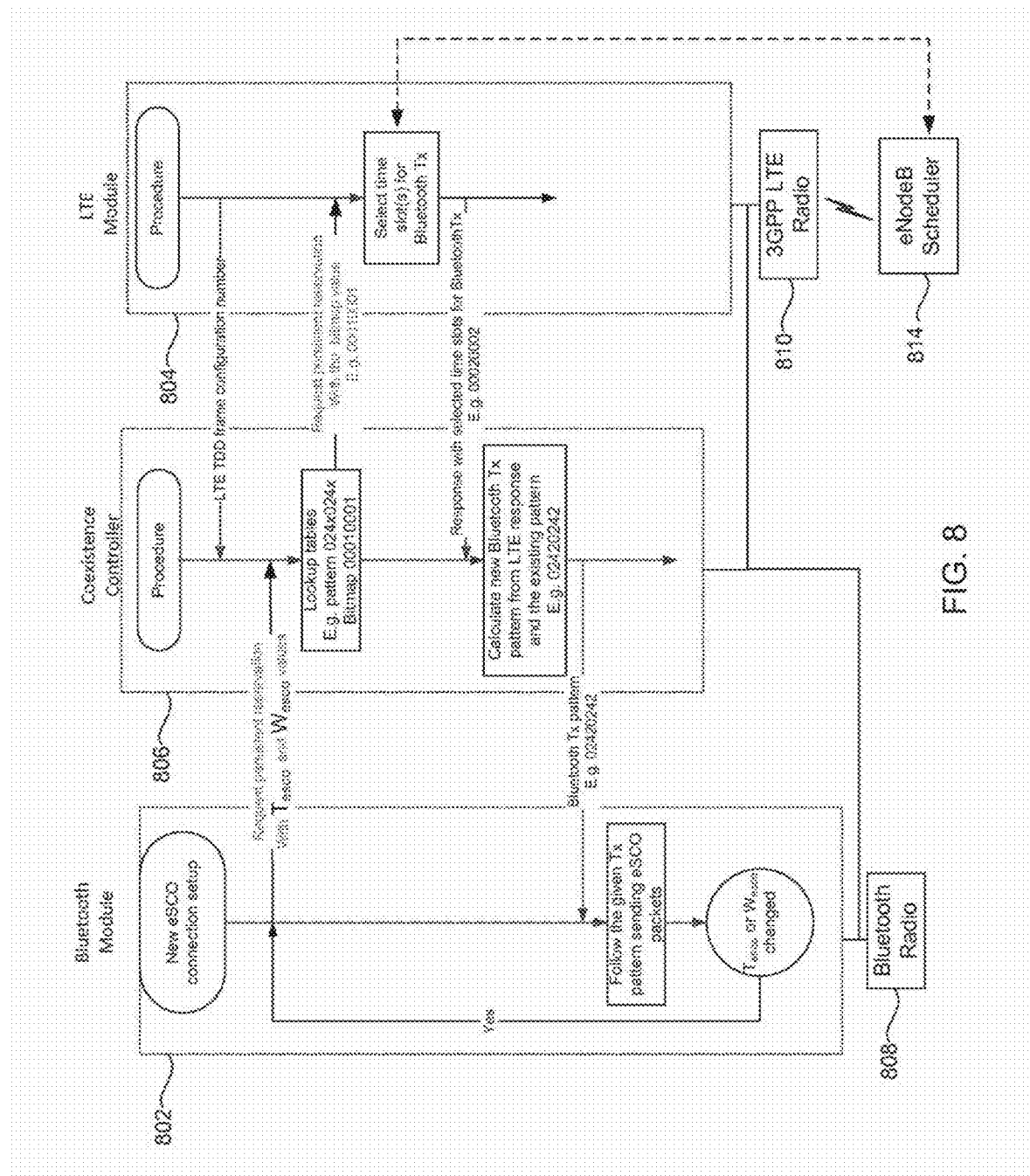
FIG. 8 is a flow chart providing an implementation wherein a Bluetooth radio and a 3GPP LTE radio communicate with a coexistence module to provide persistent reservation instructions to the 3GPP LTE radio, in accordance with an example.

FIGS. 5a and 5b shows bitmaps which can be directly translated from FIGS. 4a and 4b respectively by replacing the "x" with a "1". The value "1" can indicate where a persistent reservation may be requested in the repeating pattern. The bitmaps allow the LTE radios to identify a time period when a reservation is needed with only a minimal amount of data communicated (i.e. 8 bits). FIGS. 6-8 describe three example implementation procedures to apply the persistent reservation request at the 3GPP LTE radio.

The persistent reservations request can be initiated: (1) when a new eSCO connection is established by the Bluetooth radio; and (2) when the values of $T_{eSCO}$ or $W_{eSCO}$ are changed in the middle of an eSCO communication.

FIG. 6 provides an illustration of an implementation wherein a Bluetooth radio provides the persistent reservation request to the LTE radio. In FIG. 6, the predefined Bluetooth transmit patterns (i.e. FIGS. 4a, 4b) and the associated bitmaps (i.e. FIGS. 5a, 5b) can be stored in a Bluetooth module 602 coupled to a Bluetooth radio 608. In this embodiment, the Bluetooth module can be configured to lookup the desired entry in the bitmap table. In step (1) of this example implementation, an LTE module 604 coupled to an LTE radio 610 can send the Bluetooth module the LTE TDD frame configuration number at startup that is used by the LTE radio. The frame configuration number identifies which of the seven LTE TDD configurations is used. In step (2), a new Bluetooth eSCO connection is established. In step (3) the Bluetooth module uses a lookup table to find the transmit (Tx) pattern based on the LTE TDD frame configuration and the duration of the Bluetooth packet ($T_{eSCO}$ value). The lookup table may contain information such as illustrated in the examples of FIGS. 4a and 4b. The Bluetooth module can also use a lookup table to find the bitmap, such as illustrated in the examples of FIGS. 5a and 5b.

In step (4), the Bluetooth module 602 can request a persistent reservation along with the bitmap value. For instance, for $T_{eSCO}$=6 and LTE TDD Frame Configuration 0, the bitmap value is equal to "00010001". Each "1" in the bitmap represents a Bluetooth packet duration for the $T_{eSCO}$ where the LTE radio needs to yield for transmission and reception of the Bluetooth radio. The LTE radio can repetitively yield at these points based on the repeating pattern with a duration of 8 Bluetooth packets for the $T_{eSCO}$ designated length of each Bluetooth packet.

In step (5), the LTE module in the mobile device can communicate the persistent reservation request to a scheduler 614 at the eNodeB. The eNode B for the LTE radio 610 can determine the Bluetooth transmit time slot(s) at which to yield transmit time to the Bluetooth radio. The eNodeB scheduler 614 has some flexibility to give the Bluetooth radio a transmit and receive slot time. For example, when $W_{eSCO}$=4, the Bluetooth packet can be transmitted at time slot 0, 2, or 4. The eNodeB scheduler can either give the Bluetooth radio time slot to transmit or don't transmit during the Bluetooth radio receiving time slot. While an eNodeB scheduler is illustrated in this example, the scheduler could also be associated with a Base Station when the Bluetooth radio is collected with a WiMAX WWAN radio.

In step (6), the LTE module 604 can respond to the Bluetooth module 602 with the decided time slot for Bluetooth transmission. For example, the response may be the repeating pattern "00020002", which can indicate that the Bluetooth radio should transmit every $4^{th}$ and $8^{th}$ Bluetooth packets at time slot 2. The LTE radio will adjust the transmit and/or receive sub-frame at that time period such that no LTE radio transmit or receive activity takes place during slots 2 and 3 of the Bluetooth packet. Alternatively, the LTE sub-frames can be adjusted to allow the LTE radio to transmit at the time interval of slot 2 and to receive at the time interval of slot 3. This allows the LTE radio to continue to transmit and receive.

In step (7), the Bluetooth radio can generate an updated Tx/Rx pattern by combining the predefined Tx/Rx pattern and the LTE response value. For example, the "024x024x" value can be replaced with "02420242", based on the indication from the LTE module that the $4^{th}$ and $8^{th}$ Bluetooth packets are to be transmitted at time slot 2. The Bluetooth radio can now transmit and receive at every time slot without interference with the LTE radio. In step (8), the Bluetooth radio can continue to transmit using the updated Tx/Rx pattern by sending eSCO packets at the designated time slots and receiving data at the next time slot.

In step (9), if the $T_{eSCO}$ value or the $W_{eSCO}$ value is changed during an eSCO session, it will trigger the Bluetooth module 602 to identify a new lookup pattern with a potentially new $T_{eSCO}$ or $W_{eSCO}$ value, and re-initiate the request of step (4).

FIG. 7 provides a flow chart for an implementation in which the LTE module can be configured to lookup the desired entry in the bitmap table and provide instructions to the Bluetooth radio. In this implementation then a Bluetooth module 702 coupled to a Bluetooth radio 708 communicates a $T_{eSCO}$ and a $W_{eSCO}$ value to the LTE module 704 coupled to an LTE radio 710 when a new eSCO connection is established at the Bluetooth module. The LTE module can then use the $T_{eSCO}$ and $W_{eSCO}$ values, along with the LTE TDD frame configuration number used by the LTE radio, to look up the Tx/Rx pattern and associated bitmap. A persistent reservation is then made at the LTE scheduler 714 for one or more time slots for the Bluetooth radio to transmit. The LTE scheduler may select a specific time slot for the reserved Bluetooth packet. The transmit pattern can then be updated by replacing each "x" with the selected time slot. This updated Tx/Rx pattern can be communicated to the Bluetooth module 702. The Bluetooth module can then transmit using the updated Tx/Rx pattern until the $T_{eSCO}$ or $W_{eSCO}$ values are changed at the Bluetooth radio. These updated values can then be communicated to the LTE module 704, which can then repeat the above process to identify a new updated Tx/Rx pattern.

FIG. 8 provides a flow chart for an additional implementation in which a coexistence controller 806 is configured to communicate with a Bluetooth module 802 coupled to a Bluetooth radio 808 and an LTE module 804 coupled to an LTE radio 810. In this implementation when a new eSCO connection needs to be setup then the Bluetooth module 802 can send a request for a persistent reservation to the coexistence controller 806. The request can include the $T_{eSCO}$ and $W_{eSCO}$ values used by the Bluetooth radio 808. Alternatively, the request may be sent separately from the $T_{eSCO}$ and $W_{eSCO}$ values. The LTE module 804 can send the LTE TDD frame configuration number that is used by the LTE radio to the coexistence controller 806. The Tx/Rx pattern and associated bitmap can be found in one or more lookup tables at the coexistence controller using the $T_{eSCO}$, $W_{eSCO}$, and LTE TDD frame configuration values. The Bitmap can be communicated to the LTE module to request a persistent reservation. The LTE module in the mobile device can forward the request to the scheduler 814 to select the time slot(s) for Bluetooth transmission by the Bluetooth radio for each "1" in the bitmap, as previously discussed.

A timeslot map, comprising the time slot for each persistent reservation, can be communicated back to the coexistence controller. An updated Tx/Rx pattern can then be calculated by combining the timeslot map with the Tx/Rx pattern. The updated Tx/Rx pattern can then be communicated to the Bluetooth module. The updated Tx/Rx pattern can be used to identify at which time slots the Bluetooth radio should transmit over the 8-length pattern. The Bluetooth radio can continue to use this pattern to transmit until a new $T_{eSCO}$ or a new $W_{eSCO}$ value is used or a new LTE TDD frame configuration number is used by the LTE radio, as illustrated in the flowchart and previously discussed.

The use of a predefined, repeated transmit/receive pattern that occurs between a Bluetooth radio and a 3GPP LTE radio enables transmission and reception on the two radios to be coordinated in a manner that can eliminate interference and reduce the number of retransmissions needed to effectively communicate data. This allows data from the Bluetooth radio to be transmitted and received with a lower packet error rate with fewer transmissions, thereby increasing spectral efficiency and decreasing the amount of power used to transmit data. The Bluetooth radio can save energy to transmit the same amount of data, reduce the amount of transmit time, and reduce interference with other wireless radios on the same platform. The repeated transmit pattern enables the coordination of transmission and reception to occur between the two radios without the need for real time monitoring or tracking, as is frequently used to manage collocated radio coexistence.

The coordination of data transmission can be accomplished in a simple fashion by transmitting a small amount of data (i.e. a Tx pattern and an eight bit bitmap) between the radios or via a coexistence controller. The relatively simple solution for coordinating data transmission can be accomplished inexpensively, thereby reducing the cost of using collocated radios.

While examples have been provided for the use of collocated 3GPP LTE and Bluetooth radios, additional collocated radios can also take advantage of the predefined, repeated Tx/Rx pattern that is used to coordinate transmission and reception of the LTE and Bluetooth radios. For instance, FIG. 9 provides an example of a collocated IEEE 802.11 "WiFi" radio used in conjunction with the LTE and Bluetooth radios.

Figure 9:
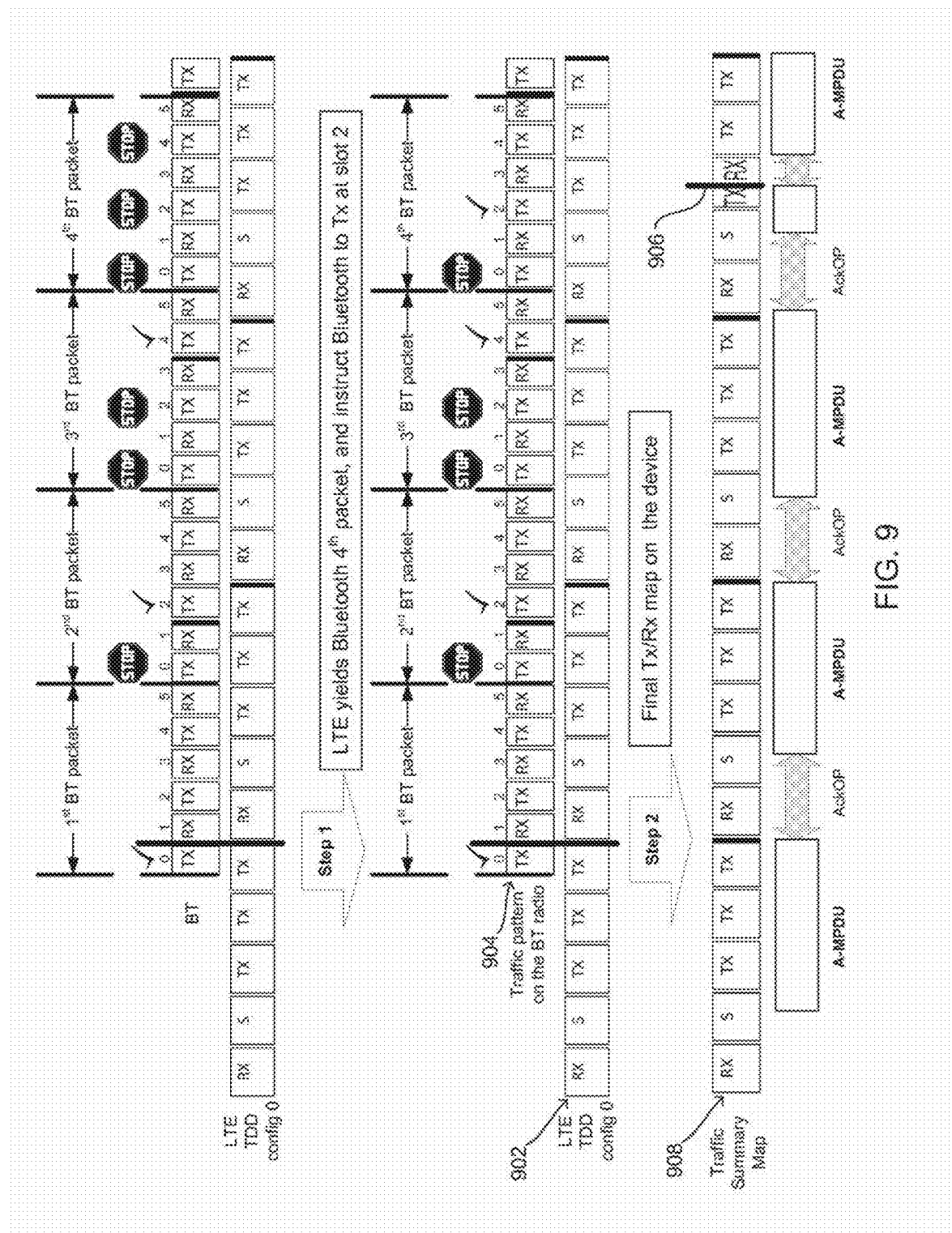
FIG. 9 illustrates a timing diagram of packets from the Bluetooth radio aligned with subframes from the 3GPP LTE TDD configuration 0 to illustrate which Bluetooth packets can transmit and receive without interference from the 3GPP LTE subframes to provide transmit and receive opportunities for a WiFi radio in accordance with an example.

In the example of FIG. 9, the LTE radio yields to allow the Bluetooth radio to transmit at Slot 2 in the $4^{th}$ Bluetooth packet, as previously discussed with reference to the examples provided in FIGS. 6-8. Communication between the Bluetooth Module, LTE Module, and/or Coexistence controller can result in the final Tx/Rx map for the LTE radio 902 and the Bluetooth radio 904. The yielding of Slot 2 in the $4^{th}$ Bluetooth packet by the LTE radio results in partial use of the subframe for Tx, and allows the Bluetooth radio to have an opportunity for Rx, as specified in subframe 906. The information provided by the Tx/Rx maps for the Bluetooth radio and the LTE radio can then be used by other collocated radios.

For example, WiFi throughput can be maximized while not creating interference with the simultaneously operation of LTE and Bluetooth transmit opportunities and receive opportunities for a collocated WiFi radio can be determined based on the LTE and Bluetooth Tx/Rx traffic summary map 908. A WiFi radio can be configured to transmit in MAC Protocol Data Unit Aggregation (A-MPDU) and receive during Acknowledgement Opportunities (AckOP), as illustrated in FIG. 9. Since the Tx sub-frames of the LTE radio always coincide with the Tx slots of the Bluetooth radio, the WiFi radio can also be configured to transmit A-MPDU during the same Tx periods of the traffic summary map to substantially reduce or eliminate interference between the three collocated radios. Similarly, the acknowledgement opportunities (AckOP) can occur when both the collocated LTE radio and the Bluetooth radios are receiving.

To maximize the throughput of the WiFi radio, the A-MPDU with the block acknowledgement can be used. To ensure that the delayed block acknowledgement is not interfered with by the transmission of the collocated 3GPP LTE and/or Bluetooth radios, a new WiFi messaging mechanism can be used to communicate the timing of the block acknowledgement period to the WiFi radio transceiver to send the block acknowledgement during the Rx time slots of the LTE radio. Both the mobile device and the WiFi transceiver that the mobile device communicates with, which can be another mobile device or WiFi access point, can use these Tx and Rx time slots to transmit data between them with minimal interference from the Bluetooth and LTE radios.

While the pattern provided in FIG. 9 for $T_{eSCO}=6$ and LTE TDD Config 0 repeats every 4 packets, the actual traffic summary map 908 can be provided for a duration of 8 Bluetooth packets. This enables a full repeating pattern to designate the Transmit opportunities (during the A-MPDU blocks) to match the Tx block and receive opportunities (during the AckOP blocks) to match the Rx blocks for the WiFi radio that is independent of the $T_{eSCO}$ value or the LTE TDD Configuration type since the Tx/Rx pattern repeats every 8 Bluetooth packets, as discussed with respect to FIGS. 3a and 3b. However, if only selected $T_{eSCO}$ values or LTE TDD configuration types are used, the repeating pattern may repeat every 1, 2, 4 or 8 Bluetooth packets, as shown in FIGS. 3a and 3b. The A-MPDU blocks and AckOP blocks can be determined accordingly.

Figure 10:
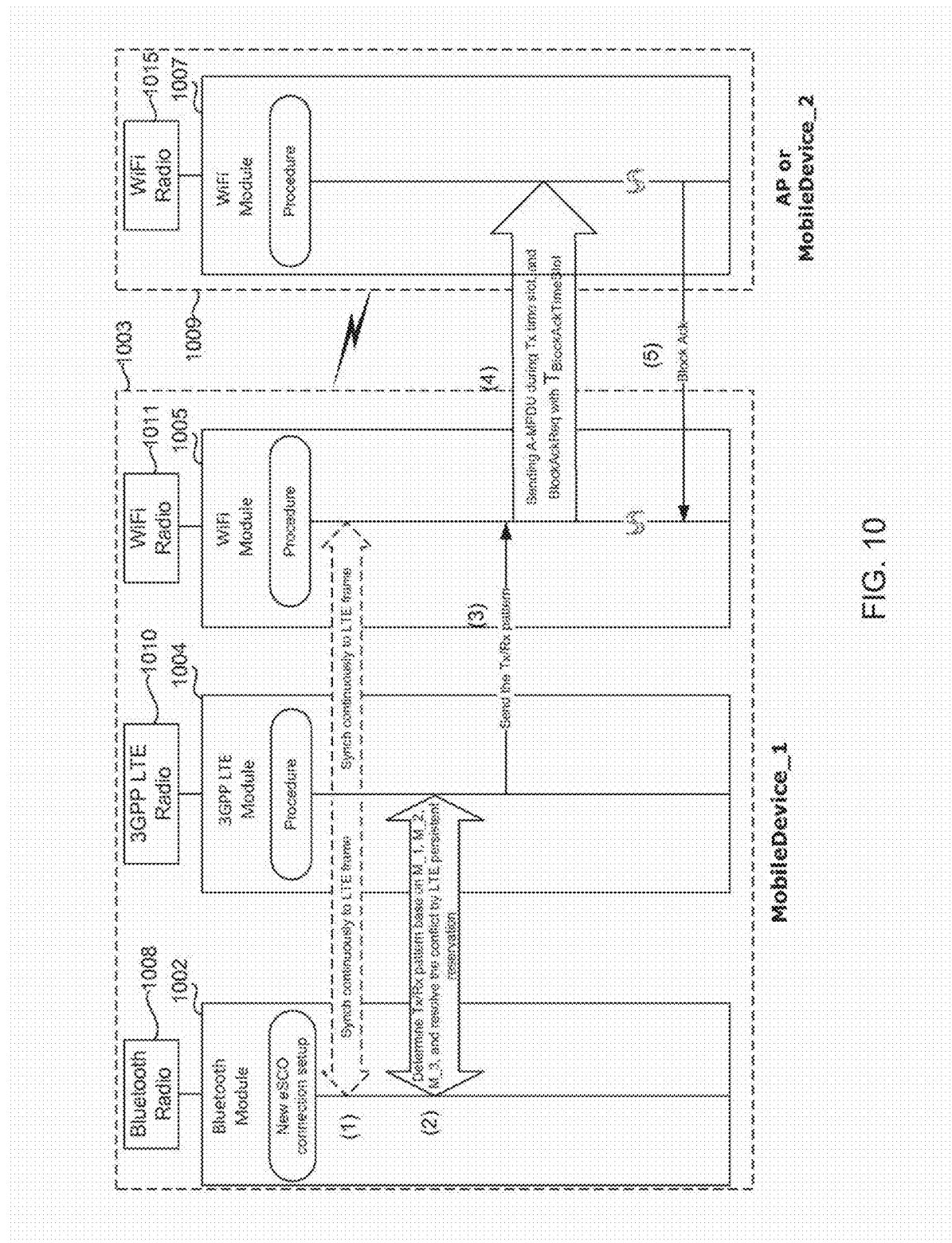
FIG. 10 is a flow chart providing a WiFi messaging mechanism used to communicate between a collocated Bluetooth radio, a 3GPP LTE radio and a WiFi radio in accordance with an example.

FIG. 10 is an example flow chart of a WiFi messaging mechanism used to communicate between the collocated Bluetooth radio 1008, 3GPP LTE radio 1010, and WiFi radio 1011 to coordinate transmission and reception time periods between the three collocated radios in a mobile device 1003. While the three radios are operating simultaneously, the WiFi radio 1011 can communicate with a second WiFi radio 1015 in a second mobile device 1009 or with a WiFi access point.

The example messaging mechanism illustrated in FIG. 10 comprises a first step (1) in which a 3GPP LTE module 1004 that is coupled to the 3GPP LTE radio 1010 frame synchronizes with a Bluetooth module 1002 coupled to a Bluetooth radio 1008. The 3GPP LTE module also frame synchronizes with a WiFi module 1005 coupled to a WiFi radio 1011. In step (2), the 3GPP LTE module and the Bluetooth radio module communicate to identify a TX/Rx pattern based on the M_1, M_2, and M_3 mechanisms that can be used to avoid interference between the LTE and Bluetooth radios. It should be noted that only the M_1 and M_2 mechanisms may be used in specific situations where the Bluetooth radio and 3GPP LTE radio are sufficiently isolated, as previously discussed. The Tx/Rx pattern can be used to resolve any conflicts between the Bluetooth radio and the 3GPP LTE radio based on persistent reservation at the LTE radio. The Tx/Rx pattern may be identified in either the Bluetooth module 1002 or the 3GPP LTE module 1004, as discussed with respect to FIGS. 6 and 7. Moreover, a coexistence controller (not shown) may be used to identify the Tx/Rx pattern, as discussed with respect to FIG. 8.

In step (3), the Tx/Rx pattern can be communicated from the 3GPP LTE module 1004 (or Bluetooth module 1002 or coexistence controller) to the WiFi module 1005. In step (4), the WiFi module uses Tx sub-frames in the traffic summary map 908 (FIG. 9) to transmit an uplink A-MPDU and to request a block acknowledgement (BlockAckReq) at a block acknowledgement time slot ($T_{BlockAckTimeSlot}$), which is the receive period in the traffic summary map 908 (FIG. 9).

In step (5), the WiFi radio 1015 in the second device 1009 can send the block acknowledgement at $T_{BlockAckTimeSlot}$ to the WiFi module 1005. The WiFi module 1007 in the second device 1009 can use the Rx subframes in the traffic summary map 908 to transmit WiFi downlink A-MPDU to the first mobile device 1003. The first mobile device can use the Tx subframes in the traffic summary map 908 to send the block acknowledgement.

While an example of using a collocated WiFi radio is provided, other types of collocated radios may be used as well. The use of a predefined, repeating Tx/Rx pattern that occurs between a Bluetooth radio and a 3GPP LTE radio enables other collocated radios to identify transmit and receive opportunities that will not interfere with the collocated Bluetooth and 3GPP LTE radio transmission and reception.

Figure 11:
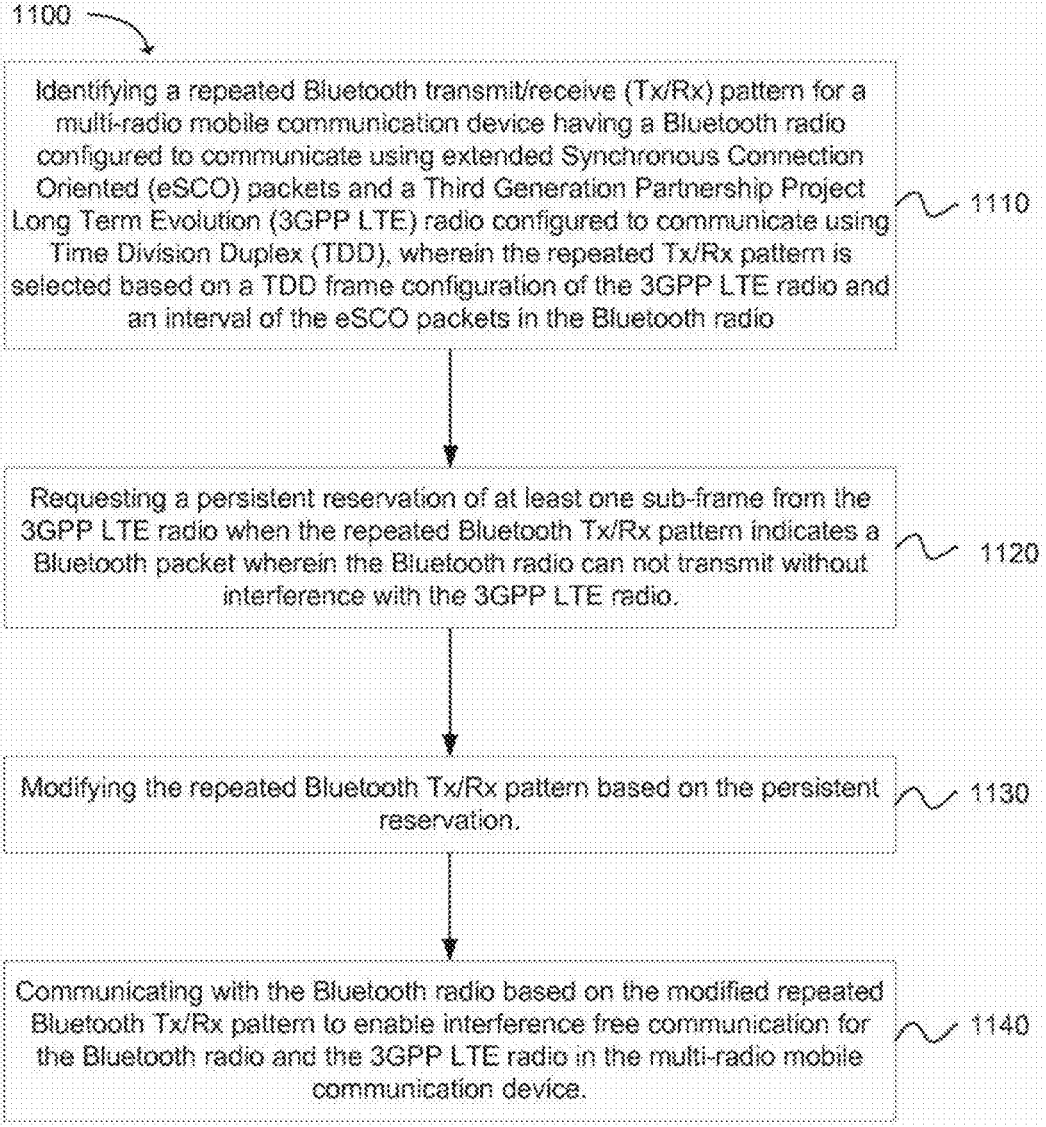
FIG. 11 depicts a flow chart of a method for reducing interference in collocated radios in accordance with an embodiment of the present invention.

In another embodiment, a method 1100 for reducing interference in collocated radios is disclosed, as depicted in the flow chart of FIG. 11. The method includes the operation of identifying 1110 a repeated Bluetooth transmit/receive (Tx/Rx) pattern for a multi-radio mobile communication device having a Bluetooth radio configured to communicate using extended Synchronous Connection Oriented (eSCO) packets and an Orthogonal Frequency Division Multiple Access (OFDMA) radio configured to communicate using Time Division Duplex (TDD). The repeated Tx/Rx pattern is selected based on a TDD frame configuration of the 3GPP LTE radio (or WiMAX) and an interval of the eSCO packets in the Bluetooth radio.

The method 1100 further comprises requesting 1120 a persistent reservation of at least one sub-frame from the 3GPP LTE radio when the repeated Tx/Rx pattern indicates a Bluetooth packet wherein the Bluetooth radio can not transmit without interference with the 3GPP LTE radio. The repeated Bluetooth traffic pattern 1130 is modified based on the persistent reservation of the LTE radio. Specifically, the traffic pattern is modified such that the Bluetooth packet that was not able to transmit is modified to provide a time slot in the Bluetooth packet at which the Bluetooth radio can transmit without interference from the LTE radio. The Bluetooth radio then communicates 1140 based on the modified repeated Bluetooth traffic pattern to enable interference free communication for the Bluetooth radio and the 3GPP LTE radio in the multi-radio mobile communication device.

Figure 12:
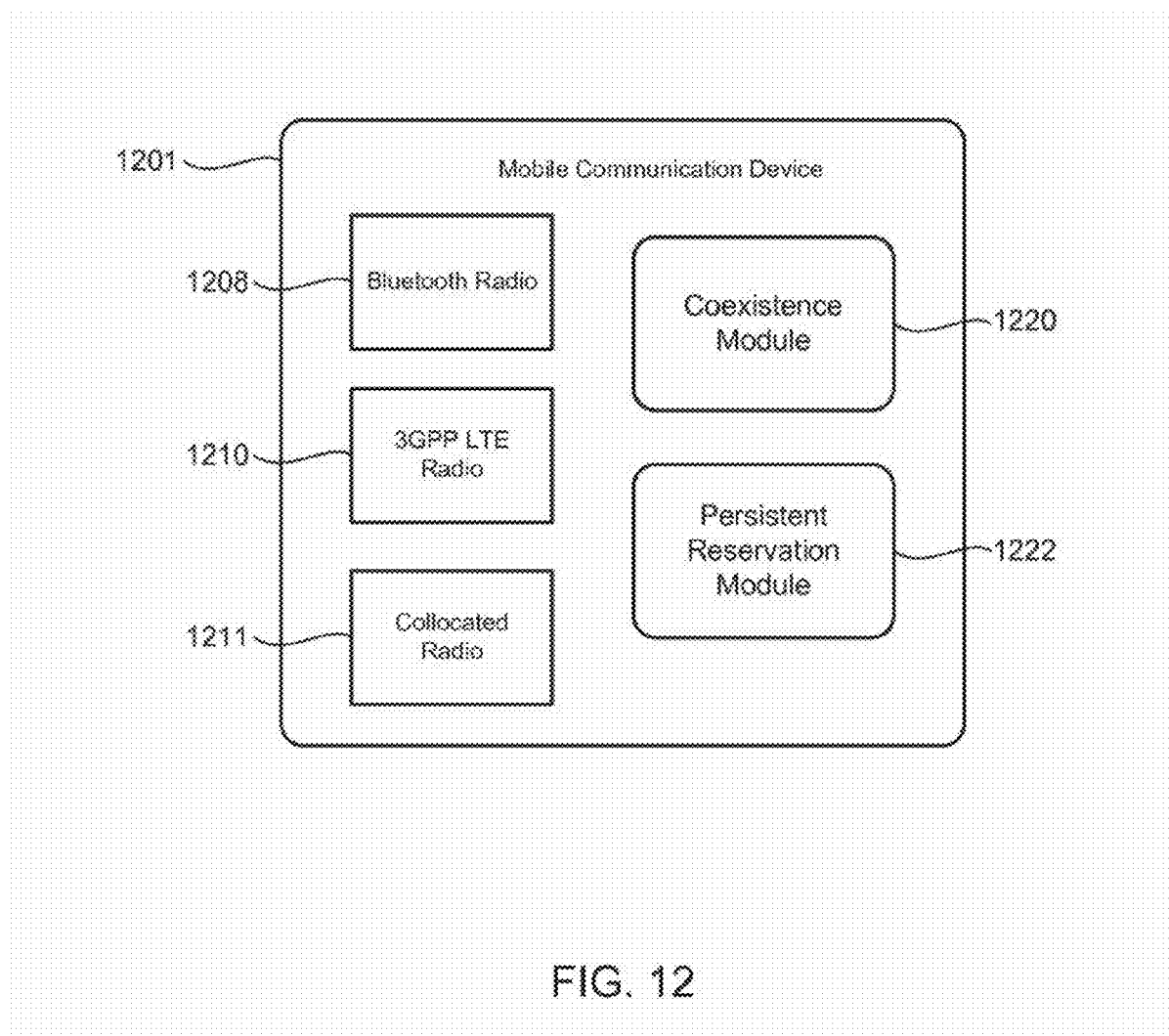
FIG. 12 illustrates a block diagram of a radio coexistence system in accordance with an example.

In another embodiment, a radio coexistence system is disclosed. FIG. 12 illustrates an example block diagram of the system. The system comprises a coexistence module 1220 operable to communicate with a Bluetooth radio 1208 configured to communicate using eSCO packets and a 3GPP LTE radio configured to communicate using TDD. The coexistence module can select a repeated Bluetooth Tx/Rx pattern based on a TDD frame configuration of the 3GPP LTE radio and an interval length of the eSCO packets in the Bluetooth radio. A persistent reservation module 1222 is configured to request a persistent reservation of at least one sub-frame from the 3GPP LTE radio when the repeated Bluetooth Tx/Rx pattern indicates a Bluetooth packet wherein the Bluetooth radio can not transmit or receive without interference with the 3GPP LTE radio. The coexistence module is configured to modify the repeated Bluetooth Tx/Rx pattern based on the persistent reservation. The Bluetooth radio can then be operated based on the modified repeated Tx/Rx pattern. The modified repeated Tx/Rx pattern can also be used to allow other collocated radios 1211 to operate without causing interference with the Bluetooth radio and the 3GPP LTE radio, as has been previously discussed. While the coexistent module and the persistent reservation module are illustrated as being located externally to the radios in the mobile communication device, it is also possible that the modules are integrated within one or more of the radios.

Figure 13:
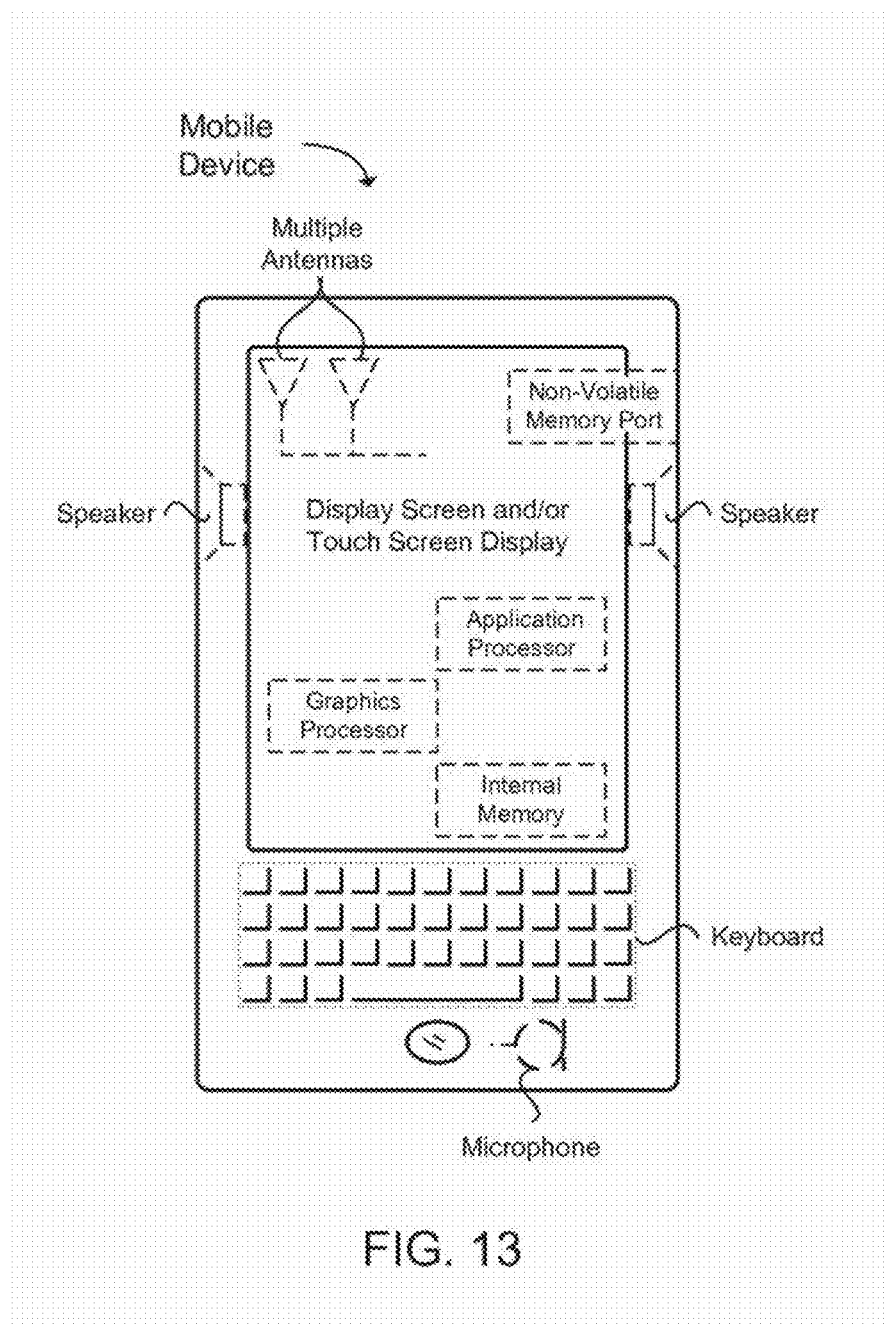
FIG. 13 illustrates a mobile wireless device in accordance with an example.

FIG. 13 provides an example illustration of a mobile communication device, such as a user equipment (UE), a mobile station (MS), a mobile wireless device, a tablet, a handset, or another type of mobile wireless device. The mobile device can include one or more antennas configured to communicate with a base station (BS), an evolved Node B (eNB), or other type of wireless wide area network (WWAN) access point. While two antennas are shown, the mobile device may have between one and four or more antennas. The mobile device can be configured to communicate using at least one wireless communication standard including 3GPP LTE, Worldwide Interoperability for Microwave Access (WiMAX), High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 13 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for reducing interference in collocated radios, comprising:
    identifying a repeating Bluetooth transmit/receive (Tx/Rx) pattern for a multi-radio mobile communication device having a Bluetooth radio configured to communicate using extended Synchronous Connection Oriented (eSCO) packets and an Orthogonal Frequency Division Multiple Access (OFDMA) radio configured to communicate using Time Division Duplex (TDD), wherein the repeated Bluetooth Tx/Rx pattern is selected based on a TDD frame configuration of the OFDMA radio and an interval of the eSCO packets in the Bluetooth radio;
    requesting a persistent reservation of at least one sub-frame from the OFDMA radio when the repeated Bluetooth Tx/Rx pattern indicates a Bluetooth packet wherein the Bluetooth radio can not transmit without interference with the OFDMA radio;
    determining if a transmit time slot and receive time slot exits in each eSCO packet that does not interfere with a transmit subframe and a receive subframe of the OFDMA radio for up to eight consecutive eSCO packets;
    modifying the repeated Bluetooth Tx/Rx pattern based on the persistent reservation; and
    communicating using the Bluetooth radio based on the modified repeated Bluetooth Tx/Rx pattern to enable interference free communication for the Bluetooth radio and the OFDMA radio in the multi-radio mobile communication device.

2. The method of claim 1, wherein identifying the repeated Bluetooth Tx/Rx pattern further comprises selecting the repeated Bluetooth Tx/Rx pattern from a predetermined table based on the TDD frame configuration of the OFDMA radio and the interval of the eSCO packets in the Bluetooth radio.

3. The method of claim 1, further comprising identifying the repeating Bluetooth Tx/Rx pattern for the multi-radio mobile communication device, wherein the OFDMA radio is one of a Third Generation Partnership Project Long Term Evolution (3GPP LTE) radio and a Worldwide Interoperability for Microwave Access (WiMAX) radio.

4. The method of claim 1, wherein identifying the repeated Bluetooth Tx/Rx pattern further comprises:
    synchronizing the Bluetooth (eSCO) packet to align a beginning of a first receive time slot in the eSCO packet of the Bluetooth radio with a beginning of a continuous receive TDD subframe of the OFDMA radio; and
    recording if the transmit time slot exists for the up to eight consecutive packets to form the repeated Bluetooth Tx/Rx pattern.

5. The method of claim 4, wherein determining if the transmit time slot and the receive time slot exists in each eSCO packet further comprises identifying if at least one additional consecutive transmit and receive time slot pairs exist in the eSCO packet that do not interfere when a first set of transmit and receive time slots in the eSCO packet are found to interfere with at least one of a transmit subframe and a receive subframe of the OFDMA radio.

6. The method of claim 1, wherein requesting the persistent reservation of at least one subframe of the OFDMA radio further comprises transmitting a persistent reservation bitmap from the Bluetooth radio to the OFDMA radio that identifies a persistent reservation of at least one transmit frame, wherein the persistent reservation bitmap identifies at least one Bluetooth packet that can not transmit without interference from the OFDMA radio.

7. The method of claim 6, further comprising communicating the persistent reservation request to one of an eNodeB and a Base Station to reserve the at least one transmit frame for the OFDMA radio.

8. The method of claim 6, wherein the repeated Bluetooth Tx/Rx pattern and the persistent reservation bitmap each contain information that repeats over a length of at least one of 1, 2, 4 or 8 cycles.

9. The method of claim 1, wherein requesting the persistent reservation of at least one transmit frame further comprises:
    communicating the interval of the eSCO packets of the Bluetooth radio to the OFDMA radio;
    identifying the repeated Bluetooth Tx/Rx pattern at the OFDMA radio based on the interval of the eSCO packets of the Bluetooth radio and the TDD frame configuration of the OFDMA radio;
    selecting a transmit time slot at the OFDMA radio for the Bluetooth radio to transmit and receive based on the persistent reservation; and
    communicating the selected transmit time slot to the Bluetooth radio.

10. The method of claim 1, wherein requesting the persistent reservation of at least one transmit frame further comprises:
    communicating the interval of the eSCO packets of the Bluetooth radio and the TDD frame configuration to a coexistence controller;
    identifying the repeated Bluetooth Tx/Rx pattern at the coexistence controller based on the interval of the eSCO packets of the Bluetooth radio and the TDD frame configuration of the OFDMA radio;
    selecting a time slot for the Bluetooth radio based on the persistent reservation;
    forming a modified repeated Bluetooth Tx/Rx pattern based on the selected time slot at the coexistence controller; and
    communicating the modified repeated Bluetooth Tx/Rx pattern to the Bluetooth radio.

11. The method of claim 1, further comprising changing the interval of the eSCO packet (TeSCO) in the Bluetooth radio and repeating the operation of identifying the repeated Bluetooth Tx/Rx pattern based on the changed TeSCO value.

12. The method of claim 1, further comprising:
    determining a traffic pattern for the OFDMA radio based on the modified repeated Bluetooth Tx/Rx pattern;
    selecting transmit sub-frames in the traffic pattern to provide a transmit opportunity for a collocated radio configured to operate based on the IEEE 802.11 standard (WiFi Radio); and
    selecting receive sub-frames in the traffic pattern to provide a receive opportunity for the collocated WiFi radio.

13. The method of claim 12, further comprising transmitting an Aggregated MAC Protocol Data Unit (A-MPDU) during selected transmit opportunities in the traffic pattern.

14. The method of claim 12, further comprising receiving a block acknowledgment from a second WiFi radio during the receive opportunity.

15. A computer program product, comprising a non-transitory computer readable storage medium having a computer readable program code embodied therein, the computer readable program code adapted to be executed to implement the method of claim 1.

16. A radio coexistence system, comprising:
    a coexistence device in a mobile communication device that is operable to communicate with a Bluetooth radio configured to communicate using extended Synchronous Connection Oriented (eSCO) packets and an Orthogonal Frequency Division Multiple Access (OFDMA) radio configured to communicate using Time Division Duplexing (TDD), wherein the coexistence device selects a repeated Bluetooth Transmit/Receive (Tx/Rx) pattern based on a TDD frame configuration of the OFDMA radio and an interval length of the eSCO packets in the Bluetooth radio; and a persistent reservation device configured to request a persistent reservation of at least one transmit frame from the OFDMA radio when the repeated Bluetooth Tx/Rx pattern indicates a Bluetooth packet wherein the Bluetooth radio can not transmit or receive without interference with the OFDMA radio and determine if a transmit time slot and receive time slot exists in each eSCO packet that does not interfere with a transmit subframe and a receive subframe of the OFDMA radio for up to eight consecutive eSCO packets;

wherein the coexistence device is configured to modify the repeated Bluetooth Tx/Rx pattern based on the persistent reservation and operate the Bluetooth radio based on the modified repeated Tx/Rx pattern.

17. The system of claim 16, wherein the OFDMA radio is one of a Third Generation Partnership Project Long Term Evolution (3GPP LTE) radio and a Worldwide Interoperability for Microwave Access (WiMAX) radio.

18. The system of claim 16, wherein the Bluetooth radio, the OFDMA radio, the coexistence device, and the persistent reservation device are all integrated in a single wireless device.

19. The system of claim 16, wherein the coexistence device and the persistent reservation device are integrated in at least one of the Bluetooth radio and the OFDMA radio.

20. The system of claim 16, wherein the persistent reservation device is further configured to the persistent reservation request to one of an eNodeB and a Base Station to reserve the at least one transmit frame for the OFDMA radio.

21. The system of claim 16, further comprising a WiFi coexistence device coupled to a radio configured to communicate based on the Institute of Electrical and Electronics Engineers (IEEE) 802.11 standard, wherein the WiFi device is configured to identify a traffic pattern for the OFDMA radio based on the modified repeated Bluetooth Tx/Rx pattern and instruct the WiFi radio to transmit during transmit time slots in the traffic pattern and to receive during receive time slots in the traffic pattern.

22. The system of claim 21, wherein the WiFi coexistence device configures the WiFi radio to transmit an Aggregated MAC Protocol Data Unit (A-MPDU) during the transmit time slots in the traffic pattern.

23. The system of claim 21, wherein the WiFi coexistence device configures the WiFi radio to receive a block acknowledgment from a second WiFi radio during the receive time slots in the traffic pattern.

24. The system of claim 21, wherein the mobile communication device is configured to connect to at least one of a wireless local area network (WLAN), a wireless personal area network (WPAN), and a wireless wide area network (WWAN), wherein the mobile device includes an antenna, a touch sensitive display screen, a speaker, a microphone, a graphics processor, an application processor, internal memory, a non-volatile memory port, or combinations thereof.

25. A computer program product, comprising a non-transitory computer readable storage medium having a computer readable program code embodied therein, the computer readable program code adapted to be executed to implement a method for reducing interference in collocated radios, comprising:

identifying a repeating transmit/receive (Tx/Rx) pattern for multiple radios located in a mobile communication device having a Bluetooth radio collocated with an Orthogonal Frequency Division Multiple Access (OFDMA) radio configured to communicate using Time Division Duplex (TDD);

requesting a persistent reservation of at least one sub-frame from the OFDMA radio when the repeating Tx/Rx pattern indicates a Bluetooth packet wherein the Bluetooth radio can not transmit without interference with the OFDMA radio;

determining if a transmit time slot and receive time slot exits in each extended Synchronous Connection Oriented (eSCO) packet that does not interfere with a transmit subframe and a receive subframe of the OFDMA radio for up to eight consecutive eSCO packets;

modifying the repeating Tx/Rx pattern based on the persistent reservation; and communicating using the Bluetooth radio based on the modified repeating Tx/Rx pattern to enable interference free communication for the Bluetooth radio and the OFDMA radio in the multi-radio mobile communication device.

26. The computer program product of claim 25, further comprising:

determining a traffic pattern for the OFDMA radio based on the modified repeating Tx/Rx pattern;

selecting transmit sub-frames in the traffic pattern to provide a transmit opportunity for a collocated radio configured to operate based on the IEEE 802.11 standard (WiFi Radio); and selecting receive sub-frames in the traffic pattern to provide a receive opportunity for the collocated WiFi radio.

* * * * *